Jan. 22, 1935.　　　　J. E. MITCHELL　　　　1,988,629
METHOD OF AND APPARATUS FOR DRYING COTTON
Filed Nov. 21, 1932　　　3 Sheets-Sheet 1
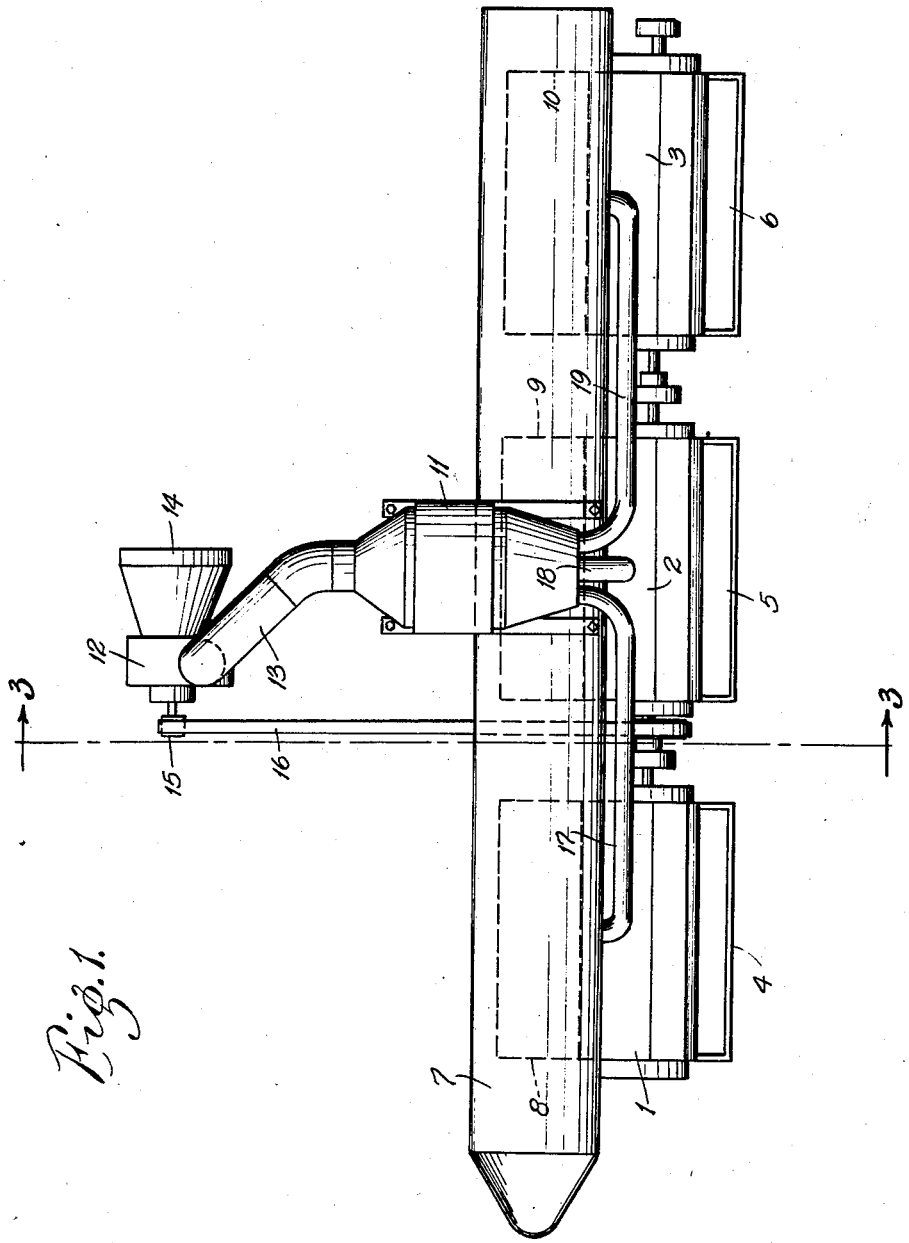
INVENTOR
JOHN E. MITCHELL
BY Bruce S. Elliott
ATTORNEY.

Jan. 22, 1935.  J. E. MITCHELL  1,988,629
METHOD OF AND APPARATUS FOR DRYING COTTON
Filed Nov. 21, 1932   3 Sheets-Sheet 2
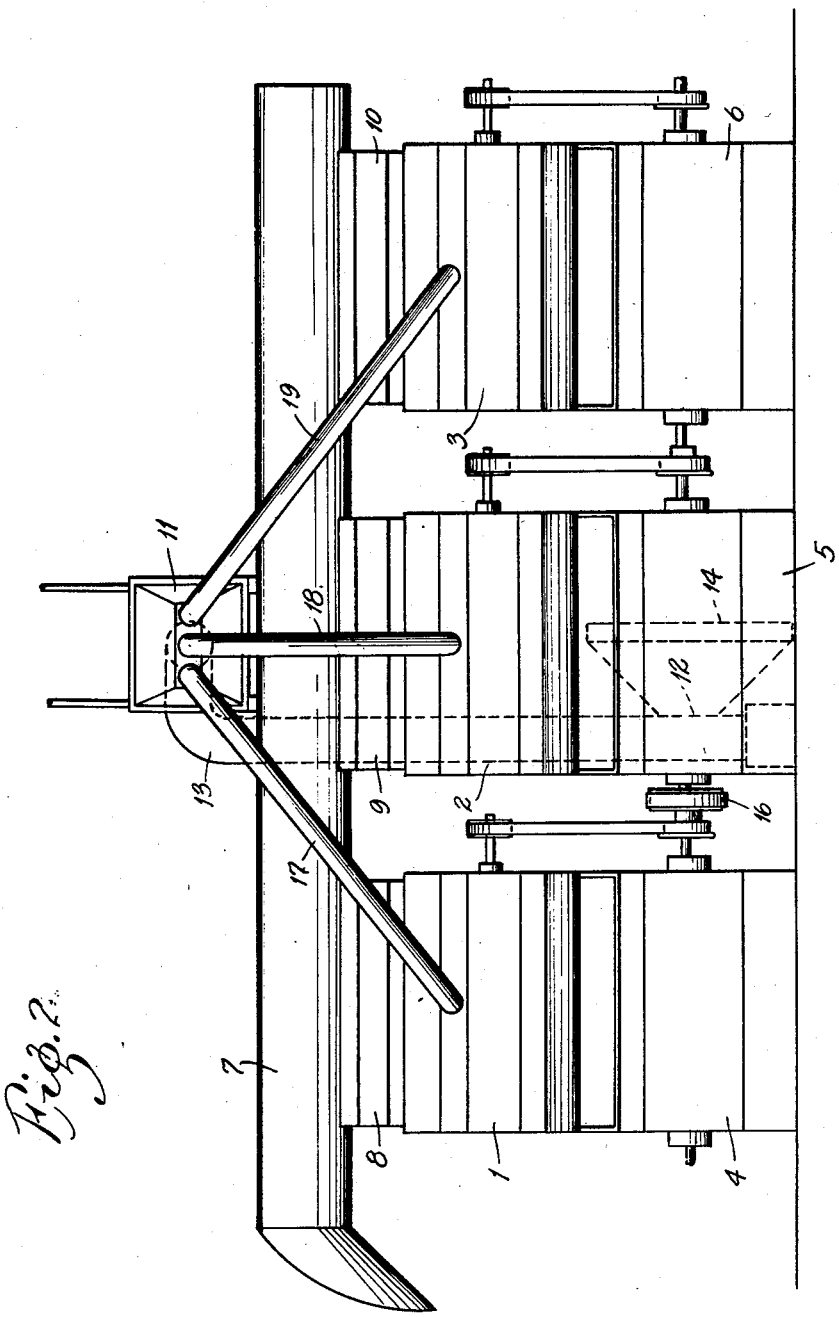
INVENTOR:
JOHN E. MITCHELL
BY Bruce S. Elliott
ATTORNEY.

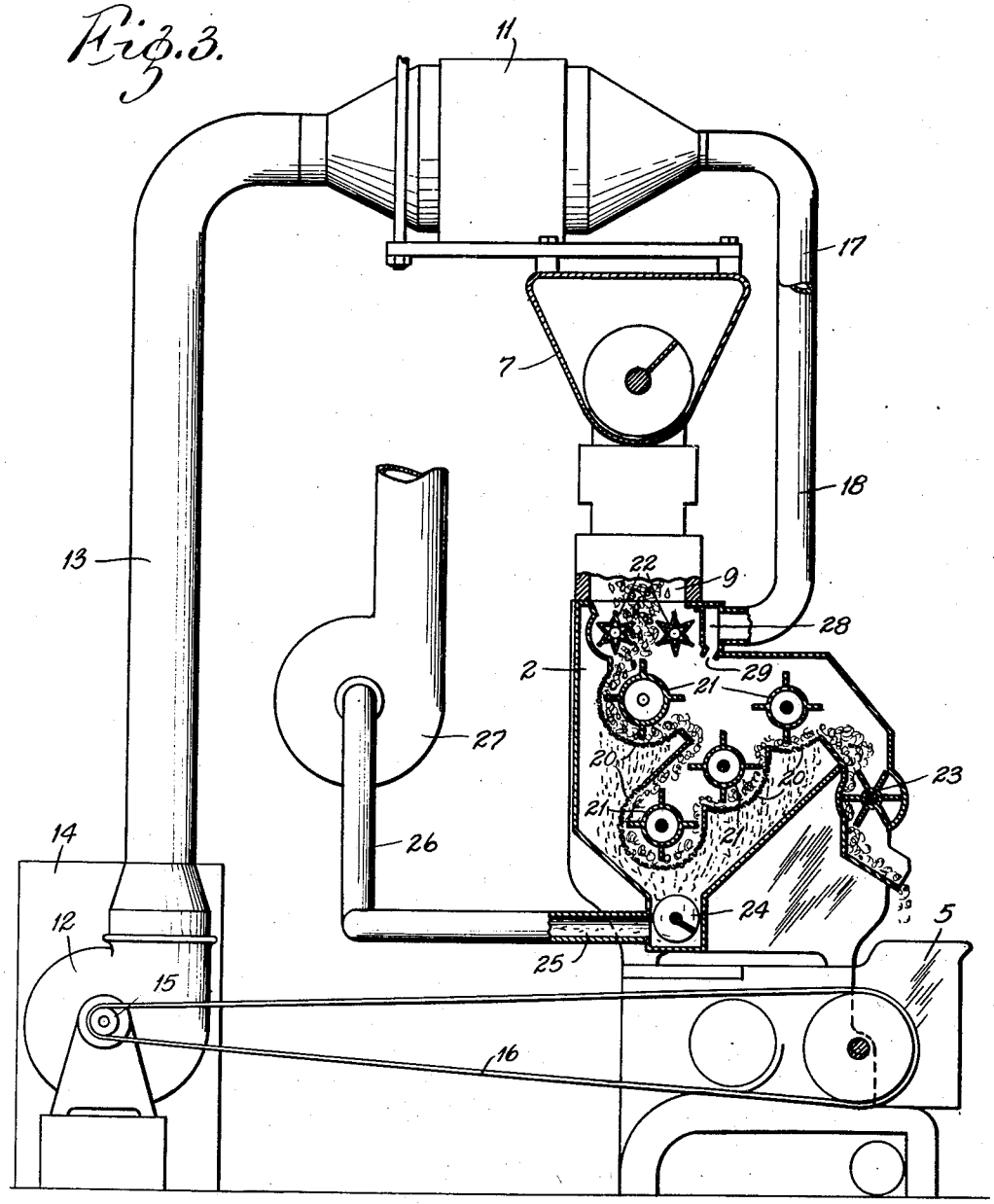

Patented Jan. 22, 1935

1,988,629

UNITED STATES PATENT OFFICE 1,988,629

METHOD OF AND APPARATUS FOR DRYING COTTON

John E. Mitchell, Dallas, Tex.

Application November 21, 1932, Serial No. 645,434

9 Claims. (Cl. 19—67)

This invention relates to the art of drying cotton and has for its general object to provide a novel method of and apparatus for drying the cotton by subjecting regulated streams of the cotton to heated air while the cotton is on its way to the gin stands.

In my pending applications, Serial No. 605,561, filed April 16, 1932, No. 608,633 filed May 2, 1932 and No. 618,876 filed June 3, 1932, I have illustrated and claimed certain means and methods of drying cotton as related to certain types of machines illustrated in said applications, and as well set forth certain broad principles in the methods employed. Since filing these applications, and as the result of an extended period of actual use of commercial embodiments of the invention, I have discovered that the successful results attending the use of my invention are dependent upon the application of the heated air to regulated streams of the cotton while it is passing through cotton treating machines mounted on the gin stands and operating to fluff and agitate such streams of cotton prior to the entrance of the same into the gin stands. It is immaterial to the successful operation of my invention what the nature of the machine may be through which the cotton passes on its way to the gin stand. As shown in my application, No. 605,561, such machine may be a simple cleaning machine; as shown in my application No. 608,633, it may be a combined cleaning and cotton extracting machine; or it may be a simple cotton extracting machine. Whatever the nature of this machine interposed between the gin and the point of feed of the cotton, such machine necessarily conditions the cotton for action by the gin, and this conditioning always involves some form of fluffing and agitation of the cotton. In order, therefore, to include within the scope of this invention, any type of machine or mechanism to which the cotton is fed in regulated quantities for treatment prior to its entrance into the gin, I will hereinafter refer to such machines as cotton conditioning machines.

In accordance with the present invention, the heated air is brought into contact with the regulated streams of cotton passing through the cotton conditioning machines simultaneously with the fluffing and agitation of the cotton.

An important feature of my invention resides in the fact that where, as is almost universally the case, a battery of gin stands and superimposed cotton conditioning machines are employed, I utilize, preferably, a central source of heat and subdivide the heated air emanating therefrom into as many currents as there are gin stands, projecting each current of heated air into the cotton conditioning machine immediately below the feed rollers located in the upper part of such machines, or below any other means that may be employed for supplying regulated streams of cotton to the cotton conditioning machines. In the event that separate or individual radiators should be used for each gin stand and the steam conveyed from a single furnace, or central source of heat to each radiator, a single fan could be used large enough to supply a sufficient volume of air for the entire battery of machines, and the air from the fan divided up in separate streams and conducted separately to the individual radiators. However, the preferable and least expensive method involves dividing up the air after it is heated by a single furnace or radiator, and sending practically the same amount of air to each of the individual streams of cotton while it is passing through the cotton conditioning machine between the feeders and the gin stand.

It is a further important feature of the invention that it is employed in connection with a cotton distributor from which depend a plurality of hoppers supplying a battery of regulating feeders above individual gin stands, and in connection therewith that the hot air is brought into contact with the individual streams of cotton while the latter is passing through the cotton conditioning machine, and effecting such contact by introducing the currents of heated air into the upper part of said machine in the zone, or area, between the feeders and the gin stands. By this method of procedure, I am enabled accurately to regulate the volume and temperature of the heated air necessary to effect thorough drying of the regulated stream of cotton.

In all other arrangements devised for drying cotton of which I am aware, the total volume of cotton is passed into a single cotton drying chamber, being supplied thereto directly from the wagon or other source of supply, and after being subjected to heat in this chamber it is conveyed to the gins. Thus, the total amount of cotton required at any one time to supply a battery of gins is attempted to be dried. I have found that it is practically impossible in many cases to effect the drying of wet cotton in this manner, for the reason that the heated air employed can not be brought into sufficiently intimate contact with the cotton fibers to effect a thorough drying of the cotton within any reasonable length of time.

Aside from the difficulties above referred to in drying cotton with a single drying machine, the necessity for afterwards re-handling and distributing the cotton to a plurality of gin stands, inevitably results in the fibers of the cotton reabsorbing moisture both by capillary attraction from the seed, and from exposure to cold air while it is being re-handled and distributed.

It has also been found in practice that if the seed cotton reaches the gin saws while it is still warm or hot, it can be ginned successfully with a greater moisture content than when it is cold. By applying the heated air to the individual streams of cotton between the feeding mechanism and the gin stand, which permits the dried cotton to reach the gin saws before the cotton fibers have time to either re-absorb moisture from the seed or from exposure to outside air, the ideal ginning condition is brought about without the necessity for excessive drying which would have a shrinking or deleterious effect upon the staple.

Furthermore, by confining the drying action to the individual streams of cotton regulated in quantities to suit the capacity of the gin stands, the minimum amount of cotton is being dried at all times, whereas when the drying is attempted in single machines ahead of the distributor, the irregular supply from the wagons must not only be contended with, but wagons are always unloaded at a rate in excess of the capacity of the gins, which results in a large portion of the cotton going to the overflow at the end of the distributor, where the fibers re-absorb moisture, both by capillary attraction from the seed and from exposure to the air, even to a greater extent than that portion which goes directly to the hoppers from the distributor.

I have discovered that the only effective way of thoroughly drying the cotton is by subdividing the bulk cotton into a plurality of streams, which occurs in the normal operation of supplying cotton to a battery of gin stands, and, as stated above, subjecting each individual stream of cotton to an individual current of hot air after the volume of each stream has been regulated in amount by the feeding mechanism which supplies it to the gin stands, which method, for the reasons stated, permits the dried cotton to reach the gin saws before the fibers have time to re-absorb moisture and while the cotton is still at a temperature which insures the best ginning condition.

My improved method of drying, therefore, is always confined to the amount of cotton the gin will handle, which is the smallest in quantity that is ever dealt with in connection with a gin plant, and which, incidentally, varies with the character and condition of the cotton being ginned. Some varieties of cotton can be ginned much faster than others, and any variety will gin faster when it is hot and has somewhere near the ideal moisture content, than when it is cold and contains excess moisture.

If the cotton were so wet that the maximum quantity of air at the highest permissible temperature forced into the conditioning machines above the gins was not sufficient to reduce the moisture content sufficiently for a good ginning condition, the amount of cotton delivered by the feeding rollers would be reduced, which would be effected, of course, in the conventional way, by reducing the speed of rotation of the rollers.

The chief purpose, therefore, of regulating the streams going to the gins is to deliver such quantities of cotton as the gin saws can handle with the best results, and the quantitive feed of the cotton will vary with the condition and character of the cotton.

In order that my invention may be clearly understood, I have illustrated in the accompanying drawings the essential features of apparatus involved in the practice of my invention.

In these drawings—

Figure 1 is a plan view of a battery of gin stands and superimposed cotton conditioning machines and showing the means for supplying individual currents of heated air to the respective conditioning machines;

Figure 2 is a view in front elevation of the same; and

Figure 3 is a section on the line 3—3 of Figure 1.

Referring now to the drawings, the numerals 1, 2, 3 indicate, respectively, three cotton conditioning machines, one of such machines being mounted on each one of a battery of three gin stands, 4, 5 and 6. Extending over the battery of stands is a cotton distributor, 7, of conventional construction, depending from which, at intervals, are three hoppers, 8, 9 and 10 for supplying cotton to the respective cotton conditioning machines 1, 2 and 3.

For supplying hot air for the purpose of drying the cotton, I preferably provide a central heater, 11, of any preferred construction, which is supplied with air by a fan, 12, and pipe, 13, the cold air being drawn in through an air filter, 14. The fan shaft has a pulley, 15, on its outer end which is driven by belt, 16, from any suitable source of power, not shown. Leading from the outlet end of the heater, or radiator, 11, are three hot air pipes, 17, 18 and 19, which lead to the respective cotton conditioning machines, 1, 2 and 3, as shown in Figure 2, and in defined relation to the stream of cotton fed into each of said machines, as illustrated with respect to the conditioning machine, 2, in Figure 3, and as now will be described.

The conditioning machine I have illustrated in section in Figure 3, is that of a simple cotton cleaning machine, such as illustrated in my prior application, Serial No. 605,561, above referred to. This machine comprises a series of screens, 20, with cooperating beating cylinders, 21, and a pair of feed rolls, 22, located immediately below the hopper 9 of the distributor 7 for delivering the cotton in regulated quantities to the cleaning mechanism. The cotton is passed over the screens by the beating cylinder, and small trash particles and dirt are separated from the cotton thereby. Associated with the outlet from the conditioning machine is an air seal dropper, 23, for discharging the clean cotton to the gin 5 below, while preventing cold air from passing into the machine. At the lower end of each of the cleaning machines, I provide a trash conveyor, 24, which delivers the trash to a suction pipe, 25, one of said pipes communicating with the bottom of each cleaning machine, and the various pipes 25, communicating with a common suction pipe, 26, leading to the inlet side of a suction fan, 27. The suction pipe 25 also serves to withdraw moist air from the bottom of the cleaning or conditioning machine, thereby causing a downward current of hot air to pass through the machine. The hot air pipe 18 communicates with the upper part of the cleaning or cotton conditioning machine 2, through the front wall of the casing thereof, and discharges its current of hot air into a spreading chamber, 28, mounted within the machine 2 and extending from side to side thereof. The lower end of the spreading chamber 28, is provided with a constricted outlet opening, 29, which is positioned some distance below the feed rollers 22, so that the hot air discharged by the force of the fan 12 through the opening 29 comes initially into contact with the stream of cotton supplied to the conditioning machine 2 only after the latter has been delivered into the machine by the feeding rollers 22. The constricted outlet opening 29 operates to spread or distribute the current of hot air throughout the whole length of each cotton conditioning machine in the area between the feeding mechanism and the gin stand, so that the hot air is applied to the stream of cotton fed into the conditioning machine over the entire lateral extent of said stream. By introducing the heated air into the upper portion of the conditioning machine below the feed rollers, and by providing an independent suction means at the lower portion of said machine, I thereby provide for effecting a division of the heated air forced into each conditioning machine into two currents, one part passing upward into the hopper above the feeding rollers and acting to preheat the accumulated cotton therein, and the other part being drawn downward by suction in the pipe 25, so that the fluffed and agitated cotton is maintained in intimate contact with a moving current of heated air during its passage through the conditioning machine. The fact that the cotton is preheated and partially dried, and a stream thereof, regulated in amount, is then subjected to the action of the downward current of heated air during the time such regulated stream of cotton is being fluffed and agitated, results in a rapid absorption of the excess moisture in the cotton by said downward current of heated air which is accelerated by the further fact that moisture-ladened air is continuously withdrawn from the bottom of the conditioning machine.

From the above description it will be seen that the bulk cotton supplied to the distributor 7 is first subdivided by being discharged into the respective hoppers 8, 9 and 10; and that the volume of the stream of cotton supplied to each conditioning machine 1, 2 and 3, is regulated by the feed rollers 22; and that this subdivision of the cotton and regulation of the volume of the stream supplied to each conditioning machine occurs prior to subjecting the cotton in the conditioning machine to the drying action of the hot air. Thus, with a known volume of cotton passing through each conditioning machine it is possible to properly regulate the volume and temperature of the current of hot air applied to the cotton to effect a thorough drying thereof. Such complete drying of the cotton occurs during the normal movement of the cotton to the gin stands and is insured not only by the fact of the reduced quantity of the cotton treated as compared with the total of bulk cotton drawn at any one interval of time from the source of supply, but also by the fact that the cotton is thoroughly agitated while passing through the cleaning machines, or other type of cotton conditioning machine mounted on the gin stands.

Finally, it will be apparent that, in effect, each conditioning machine, considered as a whole, is a feeding machine for the gin on which it is mounted, and therefore the exact point of introducing the hot air to the cotton may be varied from that shown in the drawings, so long as the hot air is brought into contact with the regulated streams of cotton passing to the gin stands between the regulating feeding mechanism and the gin stands.

I claim:

1. In combination with a battery of gin stands, a cotton conditioning machine mounted on each gin stand a distributor common to all of said machines for supplying cotton thereto, each of said conditioning machines being adapted to agitate and fluff the cotton and to deliver a regulated stream thereof to its gin, means for forcing currents of heated air into contact with the cotton in the upper portion of each of said machines, and independent means for withdrawing moist air from the lower portion of said machines, and thereby causing a downward current of the heated air to be brought into intimate contact with the fluffed and agitated cotton.

2. In combination with a battery of gin stands, a cotton conditioning machine mounted on each gin stand, a cotton distributor extending over said conditioning machines and provided with a plurality of hoppers for supplying cotton to the respective conditioning machines, feeding mechanism located below each hopper for supplying a regulated stream of the supplied cotton to the cotton conditioning machine, means for applying individual currents of hot air to the respective streams of cotton between the feeding mechanism and the gin stand, and independent means for continuously withdrawing moist air from the lower portion of the conditioning machines.

3. In combination with a battery of gin stands, a cotton conditioning machine mounted on each gin stand, a distributor common to all of said machines for supplying cotton thereto, feeding rollers adapted to deliver a stream of the supplied cotton to each machine regulated in amount to suit the capacity of its gin, said conditioning machine operating to agitate and fluff the cotton and to deliver the same to the gin, means for forcing currents of heated air into contact with the cotton in the area between the feeding rollers and the point of delivery of the cotton to the gin, and independent means for withdrawing moist air from the lower portion of said machine.

4. In combination with a battery of gin stands, a cotton conditioning machine mounted on each gin stand for fluffing and agitating the cotton and delivering the same to the gin, a series of hoppers located above the conditioning machines for accumulating and holding bodies of cotton practically uniform in quantity, a distributor for supplying cotton to the hoppers, feeding rollers located below the hoppers for withdrawing therefrom and delivering to the cotton conditioning machines streams of cotton regulated in amount to suit the capacity of the gins, means for forcing currents of heated air into the upper portion of each cotton conditioning machine, to cause a portion thereof to filter up through the cotton in the hoppers and preheat such cotton, and means for withdrawing by suction moist air from the lower portion of the conditioning machines, whereby a downward current of heated air is established in each machine to which the regulated stream of fluffed cotton is exposed during its passage from the feeding rollers to the gin.

5. Means for drying streams of seed cotton supplied to gins, comprising feeders for regulating the streams to suit the capacity of the gins, a distributor common to all of said feeders for supplying cotton thereto, cotton conditioning machines located between the feeders and gins for fluffing and agitating the cotton and delivering the same to the gins, means for forcing currents of heated air into the upper portion of said conditioning machines, and independent means for withdrawing it from the lower portion, whereby the regulated streams of cotton will be intimately exposed to the heated air while being fluffed and agitated during their passage through said machines.

6. Means for drying streams of seed cotton supplied to gins, comprising a cotton distributor, hoppers mounted above the gins for accumulating bodies of cotton received from the distributor, feeders for withdrawing the cotton from the hoppers in amounts regulated to suit the capacity of the gins, cotton conditioning machines located between the feeders and gins, supplied with cotton by said feeders and operating to fluff and agitate the cotton and deliver the same to the gins, means for forcing currents of heated air into the upper portion of the conditioning machines, and means for withdrawing a part of the heated air from the lower portion of the conditioning machines while the remainder of the heated air is permitted to filter up through the moving accumulated bodies of cotton in the hoppers and preheat such cotton.

7. In the art of drying cotton the method which consists of withdrawing bulk cotton from a source of supply, subdividing said cotton and feeding regulated streams thereof to the respective machines of a battery of gin stands, which streams are regulated in amounts to suit the capacities of the gins, fluffing and agitating said regulated streams of cotton during their passage to the gin stands, and applying currents of heated air to the cotton in a manner to cause each current of air to be divided into an upward and downward current, the upward current acting to preheat the subdivided portions of cotton and the downward current to dry the fluffed and agitated stream of cotton.

8. A battery of cotton-feeding, drying, and ginning units, each unit comprising a cotton conditioning machine mounted on a gin stand and adapted to deliver a regulated stream of cotton to the gin, and feeding mechanism for delivering to the conditioning machine a stream of cotton regulated in amount to suit the capacity of the gin, means common to the battery of units for distributing cotton to the feeding mechanism of each unit, and means for forcing a current of heated air into each conditioning machine to dry the regulated streams of cotton passing through the conditioning machines from the feeding mechanisms to the gins.

9. A battery of cotton feeding, drying, and ginning units, each unit comprising feeding mechanism for delivering regulated streams of cotton, a gin, and a conditioning machine located between the two for receiving the regulated stream of cotton from the feeding mechanism and delivering it to the gin, a hopper located above each feeding mechanism, means common to the battery of units for distributing a supply of cotton to the hopper above the feeding mechanism of each unit, and means for forcing a current of heated air into the conditioning machine of each unit to dry the regulated streams of cotton passing through the conditioning machines from the feeding mechanisms to the gins.

JOHN E. MITCHELL.